No. 630,599. Patented Aug. 8, 1899.
H. P. DOUGLAS & A. SUNDH.
PROTECTIVE CASING FOR ELECTRIC CABLES OR WIRES.
(Application filed Jan. 6, 1897. Renewed Jan. 13, 1899.)
(No Model.)
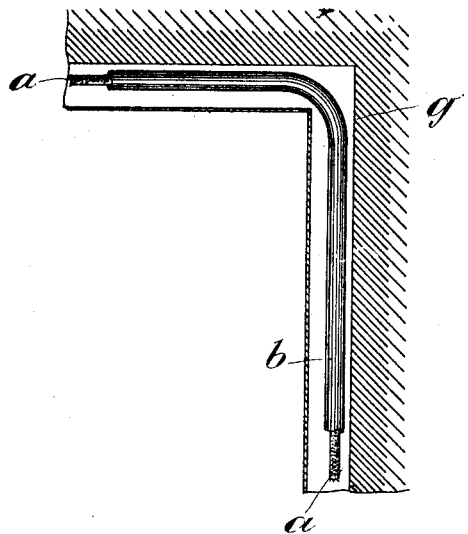
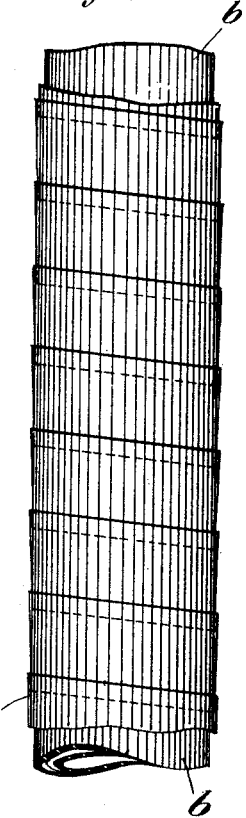
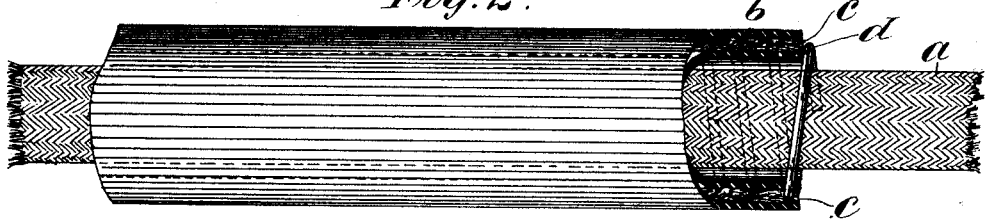
WITNESSES:
INVENTOR:
Henry Percy Douglas
August Sundh
By A. P. Thayer
Attorney.

UNITED STATES PATENT OFFICE.

HENRY PERCY DOUGLAS AND AUGUST SUNDH, OF NEW YORK, N. Y.

PROTECTIVE CASING FOR ELECTRIC CABLES OR WIRES.

SPECIFICATION forming part of Letters Patent No. 630,599, dated August 8, 1899.

Application filed January 6, 1897. Renewed January 13, 1899. Serial No. 702,089. (No model.)

*To all whom it may concern:*

Be it known that we, HENRY PERCY DOUGLAS, residing at New York city, in the county of New York, and AUGUST SUNDH, residing at New York, (Brooklyn,) Kings county, State of New York, citizens of the United States, have invented certain new and useful Improvements in Protective Casings for Electric Cables or Wires; and we do hereby declare the following to be a full, clear, and exact description of the invention, such as will enable others skilled in the art to which it appertains to make and use the same.

Our invention relates to the protective inclosing case combined with and employed for protecting the cable from fire, water, wear, or abrasion and other injuries when laid in the walls, floors, partitions, and other parts of buildings and also when used in connection with elevator-cars, as hereinafter described, reference being made to the accompanying drawings, in which—

Figure 1 represents an example of the arrangement of such cables at an angle in a building. Fig. 2 is a side view of a short section of the cable without the exterior metallic armor, a part of the case being in longitudinal section, and also showing projecting portions of an electric cable; and Fig. 3 is a side view of a short section of the case with a modified form of the exterior metallic armor.

Iron pipes or tubes are now commonly used for the protective cases of electric cables laid in the walls and other parts of buildings; but they are not satisfactory because of the difficulty of removing and again inserting the cables, owing to the short turns and obstructive nature of the elbows, which cause too much friction in pulling the cables out and make it very difficult to insert the steel tapes used for pulling the cables in again, and it is also difficult to arrange the iron tubing in the sinuous courses often required in placing them in position, and the iron tubing cannot be used with cables connected with elevator-cars, in which use the cables are often subject to abrasion by rubbing against the sides and on the bottom of the elevator-way. We therefore propose to employ flexible rubber tubing for such casings, which, instead of being applied as a close-fitting and permanent element of the cable, we arrange in such relation to the cable as enables the cable to be drawn in and out lengthwise readily for inspection and repairs of the cable without disturbance of the case. We also propose to employ such rubber cases in which asbestos fiber is incorporated with the rubber web in lieu of or together with the canvas fabric commonly used in the construction of tubing to resist bursting pressure for fireproof protection of the cable, and we also propose to construct the case with metallic armor of wire or thin metallic strips wound on the exterior in any approved way for protection against wear in handling and in use, such armor being alike applicable for cases to be laid in the walls, &c., and for application to cables connected with elevator-cars. The metallic-strip armor is especially useful in protecting the electric cable from nails when laid in walls, partitions, and the like, where nails are liable to be driven after the cable has been put in place.

In the drawings, $a$ represents the electric cable of common use, for which we seek to provide a better protective case, as follows: We make a rubber tube $b$ of suitably-larger size than the cable to permit the cable to be drawn in and out, said tube having a suitable quantity of asbestos fiber $c$, for protection of the cable against fire, incorporated in its structure either in mats or woven of braided fabric, and when desired for greater resistance to collapsing pressure coiled wire $d$ or thin metal strips likewise incorporated in the structure, and we apply an exterior metallic armor of thin strip $f$ for protection against wear or abrasion of the outside of the rubber case, the strip being wound so as to overlap at the edges for more effectually preventing punctures by nails which are liable to be driven into the cable when laid within walls, partitions, and the like places.

It will be seen that the case thus constructed is practically as flexible as an ordinary rubber tube and may be laid in the walls of buildings to much better advantage than iron tubing. It is equally or more protective against fire and may be used with cables connected with elevator-cars. It is especially advantageous for arranging in angles in walls $g$ of buildings, as represented in Fig. 1, in which case it is shown without the protective armor, as it may be used; but the armor will generally be preferred in such use. It will also be seen that the rubber tube being itself an insulator for the electric wires, the insulating properties of the cable will be greatly reinforced and, if desired, may be of less effective character except for insulation from each other.

We claim—

1. The combination in a protective case for electric cables adapted for the cable to be drawn in and out, of a rubber tube having a fireproof element, and a flexible metallic supporter of the web incorporated in its structure.

2. The combination in a protective case for electric cables adapted for the cable to be drawn in and out, of a rubber tube having a fireproof element incorporated in the structure, and an exterior flexible metallic armor.

3. The combination in a protective case for electric cables adapted for the cable to be drawn in and out, of a rubber tube having a fireproof element, and a flexible metallic supporter of the web incorporated in the structure, and an exterior flexible armor.

4. The combination with an electric cable, of a protective case consisting of a flexible tube, insulating material incorporated with the tube, and flexible metallic armor.

5. The combination in a protective case for electric cables, of a flexible tube, and flexible metallic armor, on the tube, said armor consisting of a spirally-wound overlapping strip.

In testimony whereof we affix our signatures in presence of two witnesses.

HENRY PERCY DOUGLAS.
AUGUST SUNDH.

Witnessess:
W. J. MORGAN,
A. P. THAYER.